June 14, 1966  E. A. GARDNER  3,255,845
MOBILE FRUIT TREE WORKING VEHICLE
Filed July 2, 1964  4 Sheets-Sheet 1
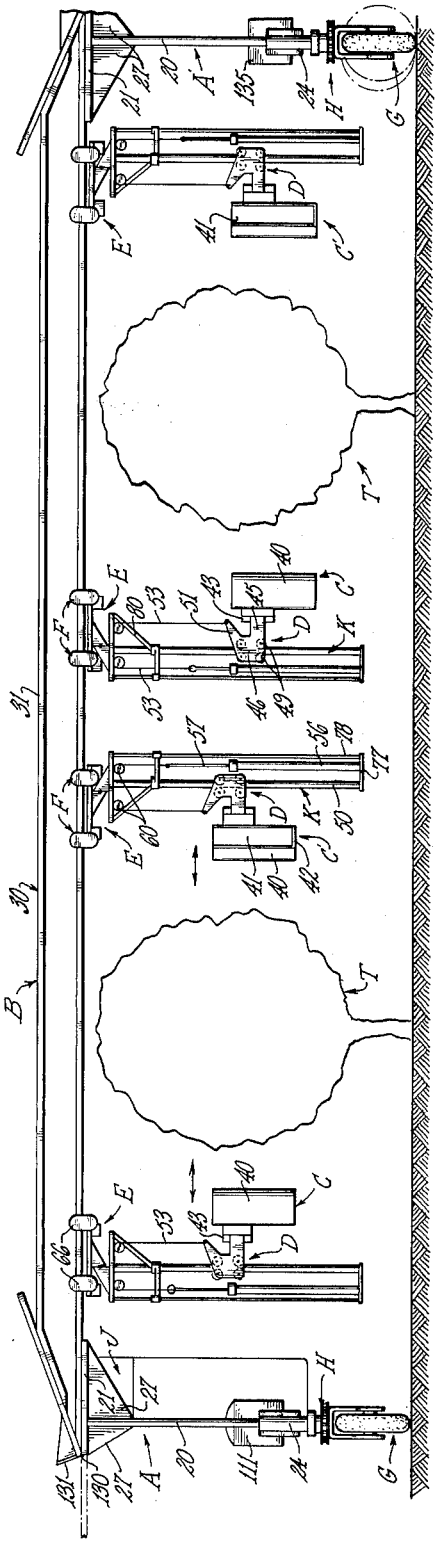
INVENTOR.
EDWIN A. GARDNER
BY [signature]
ATTORNEY

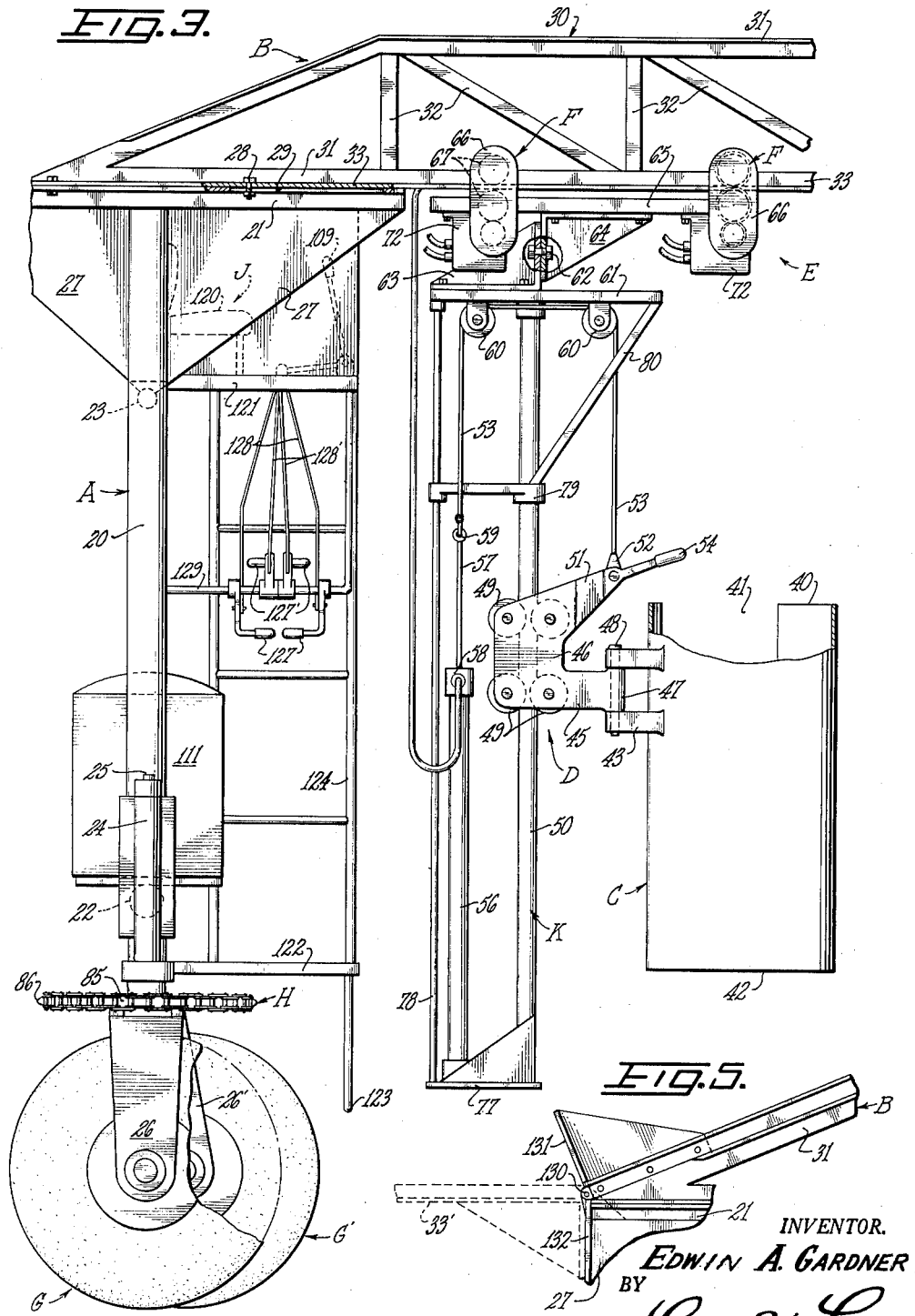

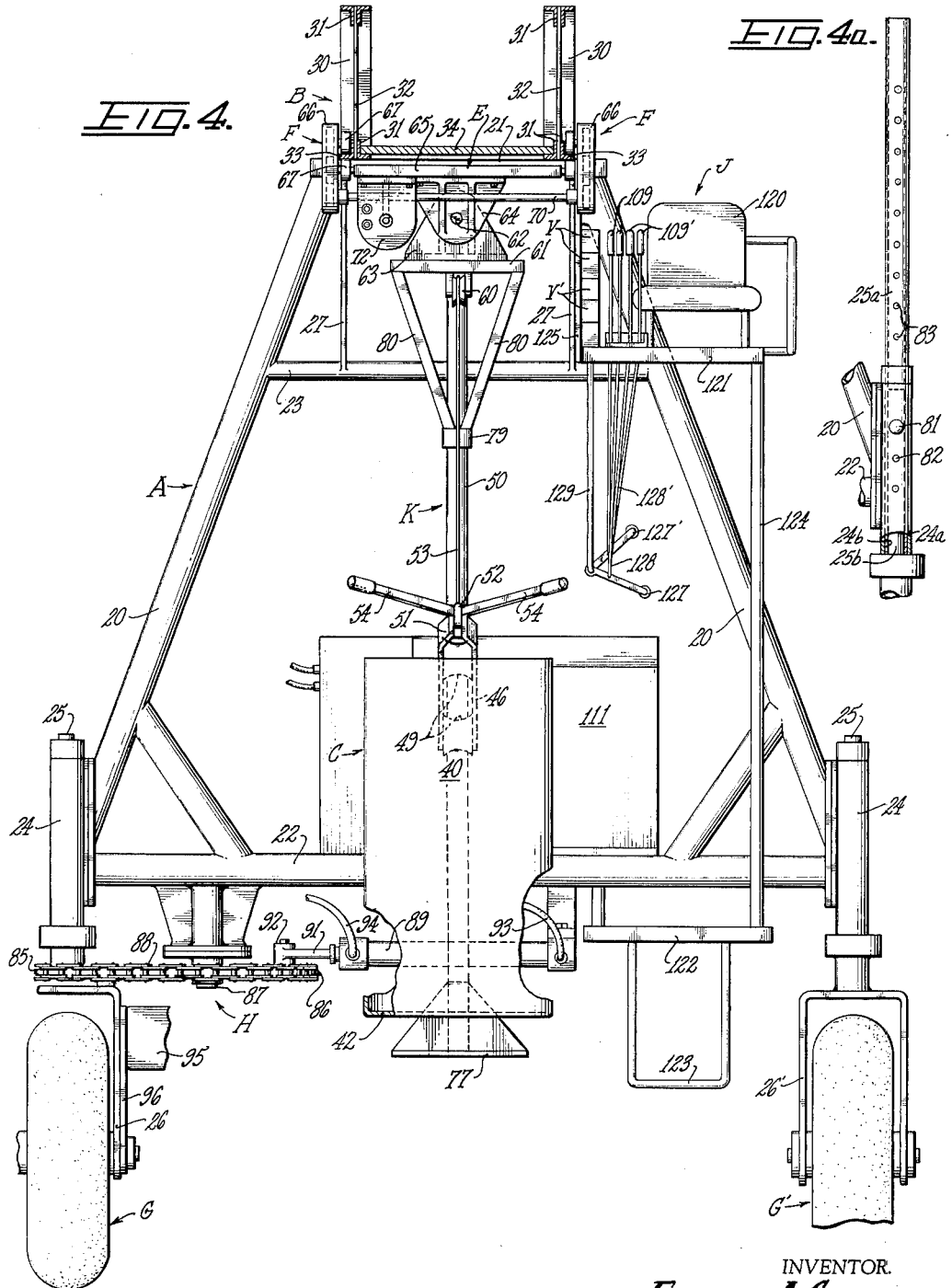

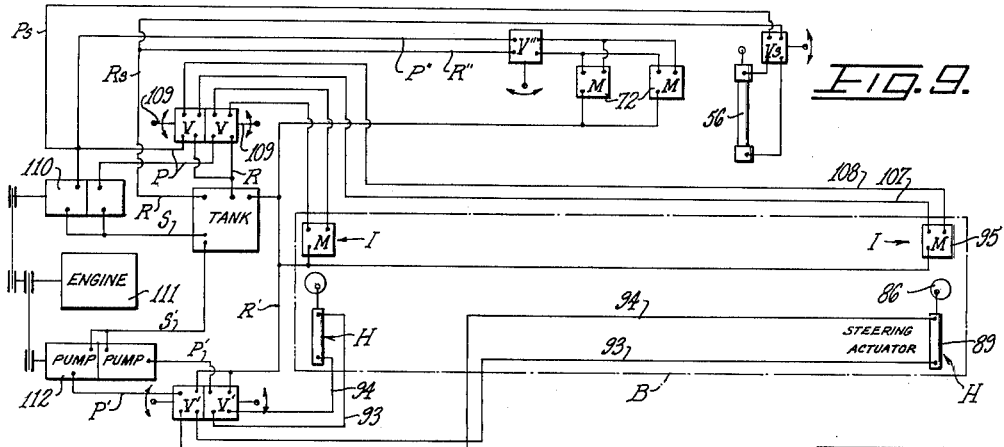
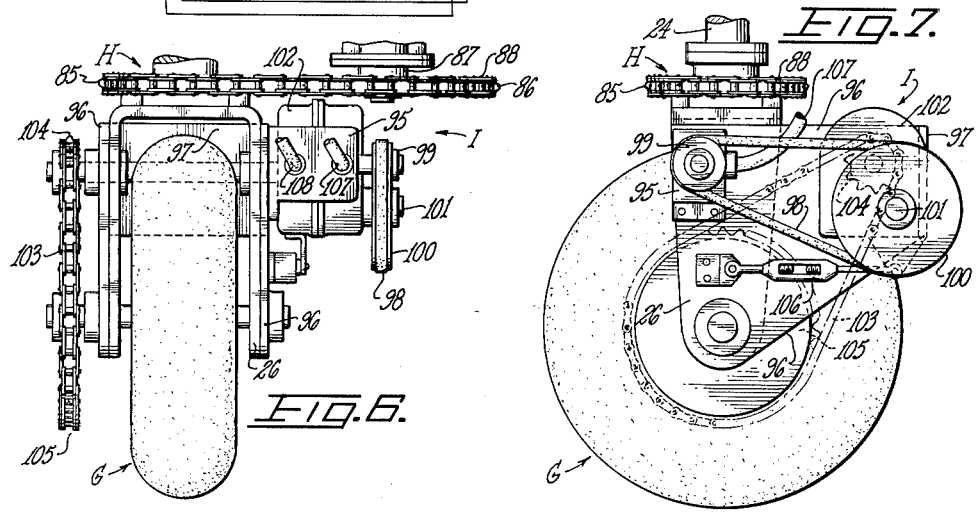
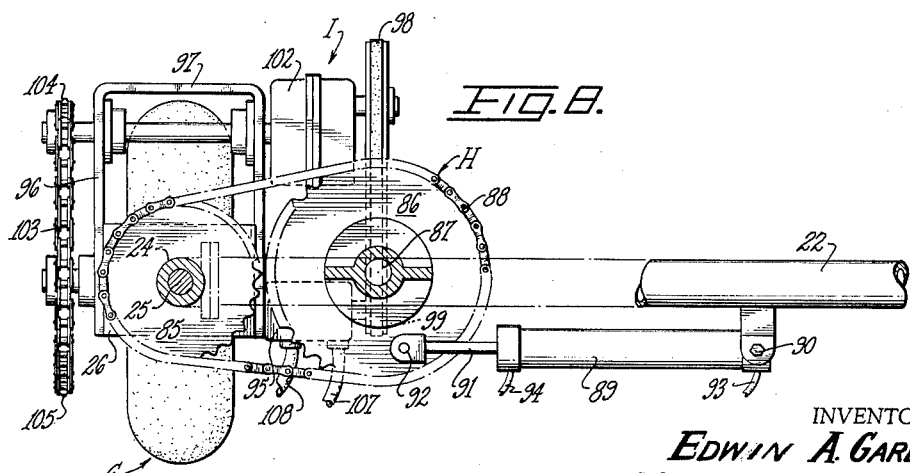

United States Patent Office 3,255,845
Patented June 14, 1966

3,255,845
MOBILE FRUIT TREE WORKING VEHICLE
Edwin A. Gardner, Ventura, Calif., assignor to Edwin A. Gardner, Ventura, Calif., and Sabin P. Sturtevant, Van Nuys, Calif., copartners
Filed July 2, 1964, Ser. No. 379,788
12 Claims. (Cl. 182—14)

This application is a continuation-in-part of my U.S. application Serial No. 249,026, filed January 2, 1963, for high speed method of manual orchard fruit picking, and picker transportation and fruit-delivery apparatus for the same.

This invention relates to vehicles for use in fruit orchards and has as its general object to provide a vehicle for carrying a number of tree workers along one or more rows of fruit trees for various operations which are performed by a pair of workers on opposite sides of each tree that is passed by the vehicle.

The invention provides a mobile vehicle that can be used in such orchard operations as pruning, spraying and selective fruit-picking and such other operations as may require the workers to operate around, over and within a tree. The principal object of the invention is to provide a transportation apparatus which will substantially increase the volume of work that can be accomplished by each worker in a given period of time, thereby reducing the unit cost of tree operations in terms of labor cost.

Toward the attainment of this general object, the invention provides a worker-transportation vehicle:

(1) Having a pair or several pairs of opposed operator-platforms or cages suspened from a traveling gantry frame adapted to span over one or more rows of fruit trees, and to position the operators for operations along the respective sides of a tree being traversed by the gantry frame;

(2) Having a combination of traveling carriage means and lift means for each cage, both under the control of the operator in the cage, for vertical and horizontal movements of the cage with reference to the tree being worked, such as to vary the elevation of the cage relative to the tree and its distance away from the center of the tree;

(3) Having a swiveling mounting of each cage on its respective lift apparatus together with handle bar means which can be grasped by the operator to manually shift the cage about the vertical axis of such swiveling mounting so as to effect lateral adjustment of the cage position with reference to the tree;

(4) Having a combination of steerable and castering travel wheels supporting the respective ends of the traveling gantry frame in a manner such as to achieve maximum maneuverability of the gantry frame with a minimum turning radius, for movements within and outside of an orchard;

(5) Having, in combination with such maneuverable steering arrangement, mechanism for individually driving one of the travel wheels at each end of the gantry frame so as to execute the maneuvering provided for by such steerable wheel arrangement;

(6) Providing for control of the transportation and maneuvering of the gantry frame at a single control station at one end of the frame such that the control can be exercised by an extra operator functioning as a driver or by the nearest tree worker, operating from his carrying cage.

(7) Carrying an engine-driven fluid pump supplying fluid under pressure to fluid motors for ground wheel driving and steering, under control of a driving operator, and to other fluid motors, individual to the several worker-support carriages, for executing the several movements of those carriages;

(8) Carrying an air-compressor and air-operated tools such as air-clippers, air-saws, etc.;

(9) Having worker-support hangers that are detachably hung from an overhead gantry bridge so as to be removable to facilitate travel of the gantry frame on highways;

(10) Having worker-support hangers that are mounted for tilting adjustment with reference to their supporting bridge so as to assume vertically depending positions at all times including times when the gantry frame is operated in a tilted attitude necessarily resulting from a slope of the supporting ground surface;

(11) Having means for adjusting the effective length of the gantry bridge.

Other objects and advantages will become apparent in the ensuing specification and appended drawing in which:

FIG. 1 is a schematic plan view of a pruning vehicle embodying my invention;

FIG. 2 is a broad side elevational view of the same, illustrating the spanning of a pair of orchard rows by the vehicle;

FIG. 3 is a fragmentary elevational view of one end of the vehicle, showing one of the pruning operators' cage-carriage units;

FIG. 4 is a transverse sectional view taken on the line 4—4 of FIG. 3;

FIG. 4a is a fragmentary elevational view of one of the end supports for the vehicle, embodying means for adjusting the height of the bridge;

FIG. 5 is a fragmentary side elevational view of one end portion of the bridge of the vehicle, showing the means for extending the length of the overhead rails;

FIG. 6 is an end view of one of the ground wheel supporting units, embodying driving and steering mechanism;

FIG. 7 is a side elevational view of the same;

FIG. 8 is a plan view of the same, with connections to the vehicle frame shown in horizontal section; and FIG. 9 is a schematic flow diagram of the hydraulic apparatus of the vehicle.

Referring now to the drawings in detail and in particular to FIGS. 1 and 2, I have shown therein as an example as one form in which the invention may be embodied, a transportation vehicle suitable for use for tree pruning operators, and other tree operations, embodied in a gantry frame comprising, in general, a pair of wheel mounted end frames A and A' respectively and an overhead bridge beam B the respective ends of which are provided with trussed connections to the respective end frames A and A'. Two pairs of opposed tree-operator carriages (cages) C and C' are each mounted upon a lift carriage unit D which in turn is mounted for vertical movements upon a respective transport carriage E traveling horizontally upon the overhead bridge beam B.

Each transport carriage E is provided with a respective power actuator units F, under the control of the operator carried in the respective cage C, for effecting power driven horizontal travel of carriage E along the bridge beam B. Each lift unit D is provided with suitable power actuator means for elevating and lowering the same, likewise under the control of the operator in the respective cage.

The A-frames A and A' are mounted upon respective pairs of ground transportation wheels, each pair comprising a steerable, power driven wheel unit G and a castering wheel unit G'. Independent steering mechanisms H are provided at the respective ends of the vehicle, for steering the wheel units G. Independent power drive units I are provided at the respective ends of the machine for driving the wheel units G. At one end of the vehicle there is provided a control station J (FIG. 4) equipped with a driver's seat, where an operator can control the transportation and manuevering of the vehicle.

Before proceeding with the detailed description of the apparatus, it may be pointed out that in the operations of a pair of (e.g., pruning) operators on respective sides of a row of trees (two rows being indicated at T in FIG. 2) a pair of operator's carriages C and C' will be moved into embracing relation to a tree T by forward movement of the gantry frame A, B along the tree rows (at right angles to its longitudinal tree-spanning axis) with the ground wheels G, G' disposed as shown in full lines in FIG. 2 with their rotational axes parallel to the longitudinal axis of the vehicle. The vehicle will be advanced along the tree rows in frequently-recurring steps of movement of a foot or two at a time (e.g., as indicated by the travel-direction arrows seen in FIG. 1). As the vehicle reaches a pair of trees (e.g., in the position indicated in phantom in FIG. 1) the operators of each pair of operator cages C, C' will cause their respective horizontal transport carriages E to move their respective cages C, C' toward one another sufficiently to enable them to reach the side of the tree facing the approaching vehicle (e.g., at p in FIG. 1). As the vehicle approaches closer to the pair of trees and commences to span above them, each pair of operators will back their cages C, C' away from the tree so as to follow roughly along the perimeter of the tree in a generally circular path as viewed in plan in FIG. 1, and as indicated by the arcuate arrows a' seen in that figure. As the bridge beam B passes over the center of the tree, the pair of cages C, C' will be spread apart at maximum spacing for pruning operations, and as the vehicle passes beyond the center of the tree toward the far side in its direction of travel, the cages, C, C' will again be moved toward one another around the far side of the tree as indicated by the arcuate arrows a".

Throughout this general path of movement encircling a tree, the pair of cages C, C' may be maneuvered laterally (with respect to the longitudinal axis of the vehicle) by manually-actuated swinging movements about vertical axis hinges connecting the cages C to their lift carriages D, and will be maneuvered vertically as required. The combination of power-driven approaching and receding movements (indicated by double arrows in FIG. 2) of a pair of cages, together with power-driven elevating and lowering movements and the individual local lateral swinging movements, makes it possible for the operators to maneuver their cages to all points around and within a tree where they may see the need for pruning or such other operation as may be required. In many instances the cage of an operator may be moved physically into a tree between branches thereof so as to position the operator for most effectively reaching the branches requiring pruning.

While operating along a pair of tree rows, the driver of the vehicle will move it forwardly in intermittent steps of advance parallel to the tree rows and at right angles to its longitudinal bridge beam axis. However, when maneuvering the machine at the end of a pair of tree rows in a head row (extending transversely to the tree rows at one side of a field and providing communication between them) the driver will make use of the individual steerability of wheels G at the respective ends of the vehicle, coupled with the castering action of the respective wheels G', to maneuver the vehicle along the head row at right angles to its path of travel along the pair of rows just completed, and the maneuverability is such that when the vehicle has been moved into the head row with its longitudinal axis extending along the head row, the steerable wheels G can then be rotated on their vertical steering axes 90 degrees to the positions shown in phantom in FIGS. 1 and 2, and the vehicle can then be moved over to the next pair of tree rows as indicated by the phantom arrows of FIG. 1.

When the pruning or other operation on an orchard has been completed (or at any time when the vehicle reaches the end of a head row and it may be desired to move it along another head row or access road extending parallel to the rows of trees just pruned, or in any other situation where a turn of the vehicle may be required, the operator can then correlate the drives of the propelling wheel units G' with steering of the wheel units G so as to effect any desired turning operation of the vehicle. The drives to wheel units G' are reversible and are independently operable. Thus, for example, the operator can cause one of the drive wheel units G' to drive while the other one is kept in a substantially stationary position, providing a pivot point around which the driven end of the vehicle can be swung in an arcuate path determined by steering of the steerable wheel unit G associated with the wheel unit G' that is being driven. Thus the turning radius can be the length of the vehicle. An even shorter turning radius can be attained by driving one wheel unit G' in one direction and the other unit G' in the opposite direction while steering both of the wheel units G to cause the vehicle to execute a turning movement around its center of the bridge beam B or around some other turning point between the end of the vehicle.

*Detailed description*

A-frames A (FIG. 4) may each comprise a pair of upwardly converging legs 20 secured at their upper ends to platforms 21 supporting the respective ends of bridge beams B. At their lower ends and at intermediate height, the legs 21 are bridged by suitable cross bars 22 and 23. At its lower corner, each A frame is provided with a pair of vertical bearings 24 in which are journalled respective wheel spindles 25 having at their lower ends respective forks 26, 26' in which the wheels G, G' are respectively journalled. The fork 26 (FIG. 3) is aligned with its steering spindle 25 and its wheel G is centered on the axis of the spindle 25 for maximum ease of steering. The fork 26 is slanted with respect to the axis of its spindle 25 and its wheel G' has its rotational axis thereby offset laterally from the axis of its spindle 25 for castering action.

A frames A are suitably braced to the respective platforms 21 by gusset plates 27.

Bridge beam B comprises a pair of spaced parallel trusses 30 which, as shown in detail in FIGS. 3 and 4 may be of open work construction comprising pairs of opposed angle bars 31 in back-to-back arrangement with struts and brace bars 32 sandwiched therebetween. Horizontal outer flanges 33 of the lower reach of angle bars 31 function as track rails for the flanged rollers of carriages E as hereinafter described. The ends of the trusses 30 are mounted upon the platforms 21 in a manner providing for horizontal adjustment between the ends of bridge beam B and platforms 21. Adjustment means may comprise bolts 28 extending through slots 29 in a top plate of each platform 21 and through apertures in respective flanges 33 at the lower margins of beam B. The trusses 30 are bridged laterally by a cat-walk plate 34 extending the length of beam B.

Each operator's cage C, C' comprises an apron 40 adapted to extend approximately ⅔ of a circumference around the operator in the cage, to function as a shield, having a full height vertical opening 41 at one side, and having a bottom 42 upon which the operator stands. At one side, apron 40 is provided with a clevis 43 providing a hinged connection to a respective lift carriage D which will now be described.

Lift carriage D (FIG. 3) in each instance comprises an arm 45 projecting from a pair of spaced body plates 46 and terminating in a hinge sleeve 47 which is hinged to the clevis 43 by a suitable hinge pintle 48. Four flanged guide rollers 49, embraced between the body plates 46 and rotatably mounted thereon, are in embracing, rolling engagement with a vertical rail 50 of carriage E to guide the lift carriage D in its vertical travel. A pair of suspension arms 51 projecting above the pintle 48 as respective extensions of the body plates 46, are attached to a fitting 52 on the lower end of a lift cable 53. A pair of handle bars 54 are secured to the respective suspension arms 51 and project therefrom in wide-angle diverging relation past respective sides of the associated cage C or C', to be grasped in the hands of the operator and utilized as fixed anchors against which the operator may brace himself while applying a shove from his body to the apron 40 to swing the cage C or C' to one side or the other with reference to the support arm 45.

Lift apparatus D further includes an hydraulic strut comprising a cylinder 56 having therein a conventional piston (not shown) on the end of a rod 57 which projects upwardly through a packing gland 58 on the upper end of the cylinder and is attached at 59 to the other end of cable 53, the intermediate portion of which extends over a pair of rollers 60 mounted on a head frame 61 which is suspended from the carriage E. Guide rail 50 has its upper end secured to head frame 61, from which it is thereby suspended. Frame 61 and rail 50 constitute essential portions of a hanger K which is pivotally and detachably connected to carriage E by a pivot bolt 62 parallel to bridge beam B, for tilting adjustment laterally with reference to the longitudinal bridge axis. Such pivotal connection includes brackets 63 and 64, secured respectively to head frame 61 and carriage E, and having respective swiveling bearing parts coupled by bolt 62.

Horizontal transport carriage E comprises a horizontal frame 65 disposed immediately beneath the bridge beam B and having vertical drive (e.g. gearing) units 66 extending upwardly in embracing relation to the lower portion of bridge B as defined by track rails 33. Mounted on stub shafts projecting inwardly from the drive units 66, and counter-rotated thereby, are pairs of vertically-opposed traction rollers 67 in vertically embracing, gripping engagement with and traveling upon respective track rails 33.

Mounted in lower portions of drive units 66 projecting downwardly from frame 65 are drive shafts 70 which are driven by respective hydraulic drive motors 72 whereby the four rollers 67 at each end of each carriage E may be driven in unison from a respective motor 72.

Lift-guide rail 50 is attached at its lower end to a platform 77 to which the lower end of actuator cylinder 56 is anchored. A tie-rod 78, laterally spaced from guide rail 50 and suspended from one end of carriage frame 65, braces the platform 77 adjacent the cylinder 56. A cross brace 79 connects the tie rod 78 and rail 50. A pair of upwardly diverging braces 80 are connected between the cross brace 79 and one end of head frame 61, to brace the upper end of hanger K.

It will now be apparent that motors 72 are operable to drive the carriage E longitudinally along the bridge B to move the operator's cage C toward and from a tree. Simultaneously, the hydraulic actuator 56–58 can be operated to move the cable 53 in a manner to raise and lower the lift carriage D. The weight of the cage C, suspended from the one end of cable 53 in laterally spaced relation to the guide rail 50, will be effective to position the hinge axis at the end of support arm 45 in substantially fixed relation to the pulley 60 from which the suspending portion of cable 53 is suspended. Thus the outer ends of suspension arms 51 are substantially fixed with relation to head frame 61 and the body portion 46 is fixed with relation to the vertical axis of guide rail 50. With the handle bars 54 being in fixed relation to the carriage D, it is thus possible for the operator to brace himself against the handle bars in bodily shifting the cage C in lateral swinging movement about the axis of pintle 48.

The apparatus can be adjusted for operation on an inclined ground surface where tree rows extend at right angles to the direction of ground slope and the A frames will consequently be tilted laterally down-hill. By loosening pivot bolts 62, the hangers K will hang free and will assume vertically depending positions, tilted with reference to the median longitudinal plane of the vehicle.

The hangers K, with their respective lift units D and cages C, C', can be readily detached from the gantry frame to meet requirements for road-clearance in transporting the vehicle over highways by backing a flat-bed transport truck or trailer transversely beneath the bridge B and against the lower end of a hanger K, then removing the pivot bolt 62 and lowering the hanger unit upon the bed of the transport vehicle.

Each of the steering units G comprises a sprocket 85 secured to a respective wheel fork 26 and an aligned sprocket 86 rotatably mounted on an axle stud 87 suspended beneath lower cross bar 22 of a respective A frame; a sprocket chain 88 connecting the sprockets 85 and 86; and a two-way hydraulic actuator comprising a cylinder 89 having one end anchored to the frame by a pivot 90 and having a piston (not shown) provided with a piston rod 91 slidably extended through a suitable packing gland at its other end and terminating in a knuckle joint 92 connecting it to the sprocket 86. Fluid lines 93 and 94 are coupled to the respective ends of actuator cylinder 89 to convey hydraulic fluid thereto for reversible actuation thereof. The piston rod 91 has a stroke such as to rotate the sprocket 86 sufficiently to effect at least a 90° turn of steering wheel G (preferably somewhat more than 90°).

Drive apparatus I, which may be the same as the hydraulic wheel drive disclosed in my above identified prior application S.N. 249,026, comprises an hydraulic motor 95 mounted on a bracket yoke 96 comprising trapezoidal side plates embracing and secured to the sides of wheel fork 26, projecting to one side thereof and bridged by an integral connection web 97; a belt drive 98 connecting a pulley 99 on the shaft of motor 95 to a pulley 100 on an input shaft 101 of a reduction gear 102 mounted on yoke 96; and a chain drive 103 connecting a sprocket 104 on the output shaft of reduction drive 102 to a sprocket 105 on the axle of drive wheel G. The bottom of reduction gear 102 is anchored to yoke 96 by an adjustable torque link 106. Hydraulic lines 107 and 108 for conveying hydraulic fluid to and from each motor 95, are connected thereto as seen in FIGS. 6 and 7. As explained more fully hereinafter, these lines are reversibly operable to convey both pressure and return fluid, for reversible drive of the motor 95.

The hydraulic circuit for the steering actuators and the drive motors is shown in FIG. 9, the steering actuators being so designated by legend and the hydraulic motors being indicated by block diagram and the letter M. The motors 95 are connected by the reversible hydraulic lines 107, 108 to respective valves designated V. The valves, V, V are mounted on a suitable control panel 125 at the driver's station J, and are provided with suitable manual actuator levers 109. The valves V are supplied with hydraulic pressure fluid through respective pressure lines P and are connected by return lines R to a reservoir, designated "TANK." The pressure fluid comes from pumps 110, the fluid constantly being pumped to both valves V, and the fluid is bypassed through the valve and the return lines R back to the tank when it is not being directed to the motors. The pumps draw hydraulic fluid from the tank through a supply line designated S. The pumps are driven by an engine designated by legend and also by the numeral 111. The engine 111 is suitably mounted on lower cross bar 22 of the A frame which carries the driver's station J. While shown above the cross bar for clarity, the engine is preferably hung below the cross bar 22 to provide a lower center of gravity for the vehicle.

Pumps 112, also driven by engine 111, draw hydraulic fluid from the tank through a supply line S' and deliver it through pressure lines P' to a pair of valves V' which are located on the control panel adjacent the valves V so that the driver can simultaneously actuate both sets of valves for driving and steering control. Each valve V' is connected by the reversible-flow hydraulic lines 93, 94 to the respective ends of a respective steering actuator cylinder 89. The valves V' are connected by return lines R' to the tank so as to deliver back to the tank the hydraulic fluid returned from the steering actuators.

In operation of the hydraulic system, the motor-control valves V can be actuated individually and selectively from a neutral position in which the fluid pumped to them is bypassed to the reservoir through the return lines R, and to reversible driving positions (as indicated by the arcuate double arrows associated with their control levers 109). In one of these driving positions fluid will be directed to one port of a respective motor 95 and will return from the other port to the valve and thence to the respective return line R; whereas in the other driving position the circuit will be reversed, the pressure fluid going to the other port and returning from the one port. Any excess fluid pressure in either motor 95 will escape through a drain line, so designated and thence may return to the reservoir.

In a steering operation, the operator actuates the valve V' which controls the wheel he desires to steer. Like the valves V, the steering control valves are three-position valves, operable from a normal neutral position in which the hydraulic fluid being pumped to a valve V' from pump 112 will be bypassed back to the tank through return lines R'. Each of these valves also has two reverisble drive positions in one of which it will direct fluid to one end of a respective actuator cylinder 89 through one of its pair of hydraulic lines 93, 94, the exhausted fluid returning through the other line, and, in the other position, the circuit being reversed and the pressure being transmitted through the other line and returning through the one line.

The hydraulic circuit further includes, for each of the worker's carriages C, C', respective pressure and return lines P" and R" extending from one of the pumps 110 (or 112) to a reversing valve V" in a respective worker's cage C, C', the valve V" having reversible-flow connections, in parallel, to a respective pair of motors 72 for effecting horizontal travel of a respective carriage E; and respective pressure and return lines Ps and Rs extending from a pump 110 (or 112) to a valve Vs, likewise located in the respective worker's cage C, C' and having reversible-flow connections to a respective hydraulic actuator 56–58.

The fluid lines extending from the valves V and V' to the remote end of the vehicle remote from the driver's station J are carried just beneath the bridge B from one end of the bridge to the other. The same is true of the pressure and return lines P", and R" and Ps, Rs, sufficient excess length being provided for accommodating the range of movement of each worker's carriage along the bridge beam B.

Apparatus at driver's station J includes a driver's seat 120 mounted on an upper platform 121 carried by A frame leg 20 and cross-bar 23; a lower platform 122 and step 123 carried by the lower cross bar 22 of the A frame; a ladder 124 for ascending from the lower platform 122 to the upper platform 121; a control panel 125 on which are mounted the valves V and V' and other necessary controls; respective control levers 109 and 109' for the valves V and V' respectively, mounted on the upper platform 121 in a location where they can be conveniently reached by the driver when sitting in seat 120; and duplicate control levers 127 and 127' at a position sufficiently low so that they can be reached by an operator standing on the step 123. The levers 127, 127' are linked to levers 109, 109' by connecting rods 128, 128' respectively. Levers 127, 127' are fulcrumed in a suitable frame 129 connected between platform 121 and A frame cross bar 23. In lieu of the duplicate drive wheel controls 127, 127'; the invention contemplates the provision of duplicate controls located within the first worker's cage (nearest to driver's station J) whereby the worker in that cage can control the advance of the vehicle in the orchard while also executing his respective pruning or other tree operation.

It will now be apparent that a driver can control each of the driving motors and each of the steering actuators separately and individually and can employ any combination of driving of one or both wheels G and of steering either or both of these wheels so as to attain the high maneuverability described hereinbefore. While traveling the vehicle along a pair of tree rows, the wheels G will be positioned with their rotational axes parallel to the longitudinal bridge axis of the vehicle so as to drive the vehicle in a path at right angles to such longitudinal axis. The forward advance of the vehicle will ordinarily be effected intermittently in short steps of advance coordinated with the speed with which the tree-operators execute their work. Each of the tree-operators can remain constantly in his operator's carriage C, individually controlling his set of controls for horizontal movements and lift movements, while utilizing the body-powered swinging movements of his cage as occasion may require, to rapidly move to all points around and within the tree being pruned in the area being spanned by the bridge. When one tree has been completed, a slight advance of the vehicle will bring the operators into position for commencing work upon the next tree. No time is lost by the operators in moving from position to position, and a high percentage of labor time is thereby saved.

As shown in FIG. 5, the invention contemplates the extension of the track rails 31 along the lower margin of the bridge by means of extension rails 33' hinged at 130 to respective ends of bridge beam B, adapted to be swung outwardly to extended positions aligned with track flanges 33 to constitute extensions thereof, and having rigidly braced abutment arms 131 engageable with abutment shoulders 132 on gusset plates 27 (when the A frames are in their retracted position as shown) for cantilever support of the extension rails. Such extension makes it possible to add two worker's carriages, making a total of six, the two added carriages traveling on extension rails 33'.

An air-compressor 135 (FIG. 2) preferably driven by a separate engine, and utilized to supply compressed air for operating air tools such as clippers and saws, is carried by one of the A frames. It may be located at the opposite end of the vehicle from the engine 101, as indicated. This makes it possible to provide each worker with power tools for expediting a pruning operation.

As shown in FIG. 4a, the ground wheel to A-frame connections are adjustable for height, so as to adjust the ground-clearance height of the bridge B. This is made possible by utilizing telescoping sectional construction in the wheel axle bearings to provide adjustable connections between these members and the A-frames. These bearings accordingly include tubular bearing jackets 24a and inner bearing bushing members 24b. The latter may be integral lower portions of extension posts 25a which are mounted in jackets 24a for vertically slidable adjustment, and can be fixed in selected positions of adjustment by fastener bolts or pins 81 extending through holes in the respective telescoping tubular members 24a, 25a. The axle shafts or king pins 25b of the wheel forks 26, 26' are journalled in the bushing portions 24b of posts 25a, to provide the necessary pivotal connections between the lower ends of posts 25a and the wheels. The fasteners 81 are preferably in the form of bolts having short threaded shanks extended through the apertures 82 of jackets 24a and threaded into threaded holes 83 in the tubular posts 25a, but not projecting internally of posts 25a.

Alternatively, the A-frames can be provided with legs 20 that are vertical and parallel, and sectional, telescopic construction can be embodied in these vertical legs, along with similar fastener means for securing the leg sections in selected positions of telescopic extension relative to one another.

In addition, power and air compressor equipment, the gantry frame can carry an electric generator which can be driven by the same engine which drives the air compressor. This makes it possible to utilize electric power to energize a lighting system by which the apparatus can be operated at night.

I claim:

1. In a mobile fruit tree worker transporting apparatus, in combination: a gantry frame including a substantially rigid overhead bridge beam having horizontal tracks, for spanning the trees of an orchard row, a pair of end supports carrying said beam, means bracing said end supports in fixed relation to said bridge beam, pairs of travel wheels for the respective end supports, disposable in positions transverse to said bridge beam for travel of said gantry frame along said orchard row while spanning the same; and worker supports carried by said gantry frame on respective sides of said row; said worker supports comprising respective transport carriages, each including means for travel on said tracks and means for driving said travel means for approaching and receding movements of said transport carriage with reference to a tree, hangers suspended from respective transport carriages, worker carriages guided by the respective hangers for vertical movements, and motor-driven lifts carried by the respective transport carriages for elevating the respective worker support carriages; and worker-operated control means for separately controlling the operation of the respective motors for said transport carriages and for said lifts respectively.

2. Apparatus as defined in claim 1, wherein said bridge beam comprises a pair of laterally spaced longitudinally extending trusses having at their respective outer sides, longitudinal track rails extending along the lower margins thereof; and wherein said transport carriages have, at respective sides thereof, longitudinally spaced traction rollers traveling on said track rails; drive motor means carried by the respective transport carriage; and respective drives from said motor means to the respective traction rollers for rotating the same.

3. Apparatus as defined in claim 1, wherein each of said hangers has at its upper end a detachable pivotal connection to a respective transport carriage, for lateral tilting adjustment of the hanger with reference to the gantry frame to permit vertical hanging of the hanger when the gantry frame is tilted laterally while traveling on sloping ground.

4. Apparatus as defined in claim 1, wherein each of said worker supports includes a worker's cage having a vertical-axis knuckle joint connecting the same to a respective lift carriage for lateral swinging movements of said cage in a direction generally parallel to the path of travel of said gantry frame along the orchard row.

5. In a mobile fruit tree worker transporting apparatus, in combination: a gantry frame including an overhead bridge beam for spanning the trees of an orchard row, a pair of end supports carrying said beam, pairs of travel wheels for the respective end supports, disposable in positions transverse to said bridge beam for travel of said gantry frame along said orchard row while spanning the same; said bridge beam having longitudinally extending track rails along its respective sides at its lower horizontal margin; and worker supports carried by said bridge beam for disposition on respective sides of said row, each of said worker supports comprising a transport carriage having respective pairs of traction rollers traveling on said track rails; a vertical hanger suspended from an extending downwardly from the respective transport carriage and including a vertical guide rail; a lift carriage vertically movable and guided on said guide rail; a worker's cage having a vertical-axis knuckle joint connecting the same to said lift carriage for lateral swinging movements of said cage; a suspension cable having one end attached to said lift carriage; a pair of guide pulleys guided in said transport carriage on respective sides of said guide rail, one of said pulleys being above the point of attachment of said cable to said lift carriage and said cable extending upwardly and over said one pulley, thence horizontally to the other pulley and downwardly; and a lift actuator carried by said hanger and connected to the other end of said cable for applying a pull thereto to elevate said lift carriage; and independently operable power means for transmitting rotation to said rollers and for actuating said lift actuator respectively, each of said power means being under the control of the worker in said cage.

6. In a mobile fruit tree worker transporting apparatus, in combination: a gantry frame including an overhead bridge beam for spanning the trees of an orchard row, a pair of end supports carrying said beam, pairs of travel wheels for the respective end supports, disposable in positions transverse to said bridge beam for travel of said gantry frame along said orchard row while spanning the same; said bridge beam having longitudinally extending track rails along its respective sides; and worker supports carried by said bridge beam for disposition on respective sides of said row, each of said work supports comprising a transport carriage having respective pairs of traction rollers traveling on said track rails; a vertical hanger suspended from an extending downwardly from the respective transport carriage and including a vertical guide rail; a lift carriage vertically movable and guided on said guide rail and including a frame; a worker's cage having a vertical-axis knuckle joint connecting the same to said lift carriage for lateral swinging movements of said cage; lift means for applying lift to said carriage frame; and a handle bar rigidly connected to the respective lift carriage frame and positioned to be grasped by the operator in said cage and to provide a fulcrum from which the operator can swing said cage laterally by body movement applied thereto.

7. In a mobile fruit tree worker transporting apparatus, in combination: a gantry frame including an overhead bridge beam for spanning the trees of an orchard row, a pair of end supports carrying said beam, pairs of travel wheels for the respective end supports disposable in positions transverse to said bridge beam for travel of said gantry frame along said orchard row while spanning the same; worker supports carried by said gantry frame on respective sides of said row, said worker supports comprising respective hangers suspended from said bridge beam and extending downwardly therefrom, worker support carriages, means attaching said worker support carriages to the respective hangers for guided vertical movements, and individual hoist units operating between the upper ends of said hangers and the respective carriages for elevating and lowering said carriages, said hoist units including respective individual worker-operated control units; each of said support carriages comprising a worker's platform and a pivotal connection between said platform and a respective hanger for lateral swinging movement of the platform with reference to the respective hanger.

8. In a mobile fruit tree worker transporting apparatus, in combination: a gantry frame including an overhead bridge beam for spanning the trees of an orchard row, a pair of end supports carrying said beam, and pairs of travel wheels for the respective end supports, disposable in positions transverse to said bridge beam for travel of said gantry frame along said orchard row while spanning the same, said bridge beam comprising a pair of laterally spaced longitudinally extending trusses having at their respective outer sides, longitudinal track rails extending along the lower margins thereof; worker supports carried by said gantry frame on respective sides of said row, said worker supports comprising respective motor driven transport carriages having, at respective sides thereof, longitudinally spaced traction rollers traveling on said track rails, drive motor means carried by the respective transport carriages, respective drives from said motor means to the respective traction rollers for rotating the same, hangers suspended from respective transport carriages, worker carriages guided by the respective hangers for vertical movements, motor driven lifts carried by the respective transport carriages for elevating the respective worker support carriages, and worker operable control means for separately controlling the operation of the respective motors for said transport carriages and for said lifts respectively; and extension rails hinged to the ends of said gantry frame for downward and outward swinging movements from positions folded back upon said bridge beam to positions projecting as extensions of said track rails.

9. In a mobile fruit tree worker transporting apparatus, in combination: a gantry frame including an overhead bridge beam for spanning the trees of an orchard row, a pair of end supports carrying said beam, pairs of travel wheels for the respective end supports, disposable in positions transverse to said bridge beam for travel of said gantry frame along said orchard row while spanning the same; and worker supports carried by said gantry frame on respective sides of said row, said worker supports comprising respective motor driven transport carriages, hangers suspended from respective transport carriages, each of said hangers comprising a guide rail suspended from and extending vertically downwardly from a respective transport carriage, worker carriages guided by the respective hangers for vertical movements, each including a frame and vertically spaced pairs of horizontally opposed rollers embracing and traveling on said guide rail, motor driven lifts carried by the respective transport carriages for elevating the respective worker carriages, each of said lifts comprising a respective lift cable suspending the respective worker carriage, means carried by the respective travel carriage providing rolling support for the respective lift cable, power operated means for applying lift to the respective cable to draw it upwardly with respect to the respective travel carriage, thereby to apply lift to the respective worker carriage, and worker-operated control means for separately controlling the operation of the respective motors for said transport carriages and for said lifts respectively.

10. In a mobile fruit tree worker transporting apparatus, in combination: a gantry frame including an overhead bridge beam for spanning the trees of an orchard row, a pair of end supports carrying said beam, pairs of travel wheels for the respective end supports disposable in positions transverse to said bridge beam for travel of said gantry frame along said orchard row while spanning the same; said bridge beam having longitudinally extending track rails along its respective sides; and worker supports carried by said bridge beam for disposition on respective sides of said row, each of said worker supports comprising a transport carriage having respective pairs of rollers traveling on said track rails; means for effecting movements of said transport carriage longitudinally of said bridge beam for approaching and receding relation to a tree spanned by said bridge beam; vertical hangers suspended from and extending downwardly from the respective transport carriages and each including a vertical guide rail; lift carriages each vertically movable and guided on a respective guide rail; worker's cages each having a vertical-axis knuckle joint connecting the same to a respective lift carriage for lateral swinging movements of said cage transversely with reference to said bridge beam; and lift means for each of said lift carriages for applying lift thereto.

11. In a mobile fruit tree worker transporting apparatus, in combination: a mobile support including ground travel means, a horizontal overhead beam having track means, and means supporting said beam from said ground travel means; and worker supports carried by said beam, each of said worker supports comprising a transport carriage having traction roller means traveling on said track means, motor means for driving said traction roller means for driving the carriage longitudinally of said beam in approaching and receding movements with reference to a tree; a vertical hanger suspended and extending downwardly from the respective transport carriage and including a vertical guide rail; a lift carriage vertically movable and guided on said rail; a worker's cage having a vertical-axis knuckle joint connecting the same to said lift carriage for lateral swinging movements of said cage transversely beneath said overhead beam; and lift means for applying lift to said lift carriage.

12. Apparatus as defined in claim 11, including a handle bar rigidly connected to the respective lift carriage frame and positioned to be grasped by an operator in said cage and to provide a fulcrum from which the operator can swing said cage laterally by body movement applied thereto.

References Cited by the Examiner

UNITED STATES PATENTS

| | | | |
|---|---|---|---|
| 1,432,040 | 10/1922 | Schuler | 182—145 |
| 2,183,679 | 12/1939 | Hillis | 182—16 X |
| 2,553,378 | 5/1951 | Miller. | |
| 2,692,168 | 10/1954 | Gregory | 182—13 X |
| 2,821,312 | 1/1958 | Wiegel | 182—2 |
| 2,989,320 | 6/1961 | Pennington | 182—63 |
| 3,016,973 | 1/1962 | Williamson | 182—14 |
| 3,095,945 | 7/1963 | Mitchell | 182—14 |

FOREIGN PATENTS

| | | |
|---|---|---|
| 769,651 | 6/1934 | France. |

HARRISON R. MOSELEY, *Primary Examiner.*

REINALDO P. MACHADO, *Examiner.*